US009162646B2

(12) United States Patent
Ando et al.

(10) Patent No.: US 9,162,646 B2
(45) Date of Patent: Oct. 20, 2015

(54) KNEE PROTECTION AIRBAG APPARATUS

(71) Applicant: TOYODA GOSEI CO., LTD., Kiyosu-shi, Aichi-ken (JP)

(72) Inventors: Takeshi Ando, Kiyosu (JP); Takanori Komatsu, Kiyosu (JP); Tetsuya Ogata, Kiyosu (JP); Hiroki Murase, Kiyosu (JP)

(73) Assignee: TOYODA GOSEI CO., LTD., Aichi-Pref. (JP)

( * ) Notice: Subject to any disclaimer, the term of this patent is extended or adjusted under 35 U.S.C. 154(b) by 0 days.

(21) Appl. No.: 14/450,648

(22) Filed: Aug. 4, 2014

(65) Prior Publication Data

US 2015/0091276 A1 Apr. 2, 2015

(30) Foreign Application Priority Data

Sep. 30, 2013 (JP) ................................ 2013-202914

(51) Int. Cl.
*B60R 21/206* (2011.01)
*B60R 21/16* (2006.01)
*B60R 21/00* (2006.01)

(52) U.S. Cl.
CPC ....... *B60R 21/206* (2013.01); *B60R 2021/0051* (2013.01); *B60R 2021/161* (2013.01)

(58) Field of Classification Search
CPC .............. B20R 21/206; B20R 21/2155; B20R 2021/0051; B20R 2021/161
See application file for complete search history.

(56) References Cited

U.S. PATENT DOCUMENTS

| 4,948,168 | A | * | 8/1990 | Adomeit et al. | ............ | 280/732 |
| 5,209,510 | A | * | 5/1993 | Mamiya | ........................ | 280/732 |
| 6,010,147 | A | * | 1/2000 | Brown | ........................ | 280/728.2 |
| 6,135,495 | A | * | 10/2000 | Redgrave et al. | ............ | 280/732 |
| 6,276,713 | B1 | * | 8/2001 | Duletzke | ........................ | 280/732 |
| 7,055,851 | B2 | * | 6/2006 | Takimoto et al. | .......... | 280/730.1 |
| 8,231,137 | B2 | * | 7/2012 | Porcs et al. | ................ | 280/728.3 |
| 2003/0120409 | A1 | * | 6/2003 | Takimoto et al. | ............ | 701/45 |
| 2005/0062264 | A1 | * | 3/2005 | Arwood et al. | ............ | 280/730.1 |
| 2008/0079245 | A1 | * | 4/2008 | Bito | ........................ | 280/730.1 |
| 2009/0121458 | A1 | * | 5/2009 | Porcs et al. | ................ | 280/728.3 |
| 2011/0260432 | A1 | * | 10/2011 | Matsushima | ............ | 280/730.2 |

FOREIGN PATENT DOCUMENTS

JP 08-080797 A 3/1996

* cited by examiner

*Primary Examiner* — Ruth Ilan
*Assistant Examiner* — Timothy Wilhelm
(74) *Attorney, Agent, or Firm* — Posz Law Group, PLC

(57) ABSTRACT

A knee protection airbag apparatus includes an airbag and a front panel. The front panel includes a lower panel portion and an upper panel portion. When the airbag inflates, the airbag causes the upper panel portion to move to the front, and deploys in a space on a rear surface-side of the moving upper panel portion. The upper panel portion includes a general portion of an upper portion and a ceiling wall portion of a lower portion. The lower panel portion is separate from the upper panel portion, and covers a rear side of the folded airbag. The upper panel portion includes a pressure receiving portion facing the folded airbag. The upper panel portion has the vicinity of the fixation portion of the general portion as a bending deformation portion that bends when the upper panel portion moves to the front along with the inflation of the airbag.

8 Claims, 7 Drawing Sheets

KNEE PROTECTION AIRBAG APPARATUS

The present application claims priority from Japanese Patent Application No. 2013-202914 of Ando et al., filed on Sep. 30, 2013, the disclosure of which is hereby incorporated into the present application by reference.

BACKGROUND OF THE INVENTION

1. Field of the Invention

The present invention relates to a vehicle mounted knee protection airbag apparatus that can protect the knees of an occupant sitting in a vehicle.

2. Description of Related Art

As illustrated in FIGS. 1 to 4 and FIG. 7 disclosed in JP-A-8-80797, a knee protection airbag apparatus of the related art has a space for deployment and inflation of an airbag formed in front of the knees of an occupant during an operation of the airbag. The airbag apparatus includes the airbag and a front panel. The airbag is accommodated in a folded state in front of the lower limbs of the sitting occupant. The front panel is provided in front of the lower limbs of the occupant along a substantially vertical direction. The front panel includes a lower panel portion and an upper panel portion. The lower panel portion is disposed on a rear side of an accommodation portion for the airbag. The upper panel portion extends upwardly from the lower panel portion. In the airbag apparatus, when the airbag inflates, the upper panel portion of the front panel moves to the front. In the airbag apparatus, the airbag deploys and inflates in the space formed on a rear surface-side of the moving upper panel portion.

More specifically, in the airbag apparatus, the upper panel portion includes a ceiling wall portion (an upper cover) and a general portion (a movable lower cover). The ceiling wall portion is disposed above the folded airbag along a horizontal direction. The general portion extends upwardly from a rear end of the ceiling wall portion. Furthermore, a front end of the ceiling wall portion is joined to an integral hinge that is provided on an upper surface of the accommodation portion for the airbag. A notched groove is provided in the rear end of the ceiling wall portion, and the rear end of the ceiling wall portion is joined to a lower end of the general portion. A notch-grooved portion of the ceiling wall portion can be bent and inverted. A hinge portion is provided in an upper end of the general portion, and the upper end of the general portion is joined to the vehicle body via the hinge portion. In the airbag apparatus, when the airbag inflates, first, the ceiling wall portion is pushed by the airbag, and turns upwardly to the front, having the hinge portion of the front end as a turning center. The notch-grooved portion is inverted by the turning, and the general portion connected to the rear end of the ceiling wall portion also moves in a state of being connected to the ceiling wall portion. That is, the general portion moves to the front, while turning with the hinge portion of the upper end as the turning center. For this reason, a space for the deployment and inflation of the airbag is formed on a rear side of the general portion that moves to the front.

JP-A-8-80797 (refer to FIG. 6 in JP-A-8-80797) also discloses a configuration in which a locking portion is provided in the rear end of the ceiling wall portion so as to be separable from the lower end of the general portion. In the airbag apparatus having this configuration, when the airbag operates, the general portion separates from the rear end of the ceiling wall portion, and moves to the front. For this reason, the space for the deployment and inflation of the airbag is formed on the rear side of the general portion.

SUMMARY OF THE INVENTION

However, in the airbag apparatus of the related art, a bendable notched groove or a locking portion, which is separable from the general portion, is provided in the rear end of the ceiling wall portion of the upper panel portion. The ceiling wall portion is connected to the general portion, which is positioned above the ceiling wall portion, via the notched groove or the locking portion. For this reason, the connection between the ceiling wall portion and the general portion is not satisfactory. As a result, there is a problem in that a connection portion is damaged due to rupturing or the like when the airbag inflates. When the connection portion is damaged, and the airbag enters a front surface-side of the general portion, the space for the deployment and inflation of the airbag cannot be formed on the rear surface-side of the general portion.

The present invention is intended to solve the above-mentioned problems. An object of the present invention is to provide a knee protection airbag apparatus that can stably form a space for deployment and inflation of an airbag in front of the knees of an occupant.

The knee protection airbag apparatus of the present invention includes an airbag that is accommodated in a folded state in front of the lower limbs of a sitting occupant; and a front panel that is provided in front of the lower limbs of the occupant along a substantially vertical direction. The front panel includes a lower panel portion that is disposed on a rear side of an accommodation portion for the airbag, and an upper panel portion that is disposed above the lower panel portion. The upper panel portion is configured to include a general portion that is disposed in an upper portion of the upper portion panel, and in front of the knees of the occupant, and to include a ceiling wall portion that is formed integrally with the general portion, and that is disposed so as to extend from the general portion downwardly, and to cover an upper side of the folded airbag. The upper panel portion is provided in such a manner that an upper portion of the general portion is fixed to the vehicle body, and that a lower end of the ceiling wall portion becomes a free end. The lower panel portion is separate from the upper panel portion, and covers a rear side of the folded airbag, and is provided with an upper end of the lower panel portion being close to the vicinity of a lower surface of a rear end of the ceiling wall portion.

The upper panel portion is configured to include a pressure receiving portion that is a facing portion of the ceiling wall portion, facing the folded airbag, and that is disposed on a front side of a fixation portion of the general portion, being fixed to the vehicle body, and that receives a pressure from the airbag at an initial stage of inflation, and to include a bending deformation portion that is the vicinity of the fixation portion of the general portion, being fixed to the vehicle body, and that bends when the upper panel portion moves to the front along with the inflation of the airbag.

In the knee protection airbag apparatus of the present invention, when the airbag inflates, the pressure receiving portion of the ceiling wall portion of the upper panel portion receives a pressure from the airbag at an initial stage of the inflation. At this time, the pressure receiving portion is disposed on the front side of the fixation portion of the general portion, being fixed to the vehicle body. For this reason, the upper panel portion undergoes a forward turning moment. The bending deformation portion in the vicinity of the fixation portion of the upper portion of the upper panel portion, being fixed to the vehicle body, undergoes a bending deformation, and the ceiling wall portion and the general portion of the upper panel portion moves to the front, while integrally turning upwardly to the front. Accordingly, a space is formed on a rear surface-side of the upper panel portion that is provided so as to move to the front. For this reason, the inflating airbag deploys and inflates upwardly, while entering the space formed on the rear surface-side of the upper panel portion from between the upper end of the lower panel portion and the ceiling wall portion that moves to the front. The inflation of the airbag is completed in front of the knees of the occupant.

In the knee protection airbag apparatus of the present invention, the vicinity of the fixation portion of the upper portion of the general portion functions as the bending deformation portion. The ceiling wall portion, which is the lower portion of the upper panel portion, and the general portion, which is the upper portion of the upper panel portion, integrally turn upwardly to the front, so that the upper panel portion moves to the front. That is, the upper panel portion may not have a notched groove or a separation portion formed between the ceiling wall portion and the general portion, and may be formed in such a manner that the ceiling wall portion and the general portion simply and integrally connect to each other. As a result, the ceiling wall portion and the general portion are not separated from each other, and a stable forward movement of the upper panel portion is ensured.

Accordingly, in the knee protection airbag apparatus of the present invention, when the airbag inflates, it is possible to stably move the upper panel portion to the front, and thus it is possible to stably form the space for the deployment and inflation of the airbag in front of the knees of the occupant. For this reason, even though the knees of the occupant are close to the upper panel portion at the initial stage of the inflation of the airbag, it is possible to smoothly dispose the inflated airbag in front of the knees of the occupant. As a result, it is possible to make the inflated airbag to reliably protect the knees of the occupant.

In the knee protection airbag apparatus of the present invention, the upper panel portion may be provided with a bending portion in which the ceiling wall portion bends from a lower end of the general portion, and is provided to extend downwardly to the front. The upper end of the lower panel portion is preferably provided in the vicinity of a lower surface of the bending portion.

In this configuration, the general portion of the upper panel portion can be flush with the lower panel portion. In addition, it is possible to reduce a gap between the lower panel portion and the upper panel portion. For this reason, it is possible to improve the appearance of the vicinity of the front panel in front of the lower limbs of the occupant. In this configuration, it is possible to further reduce an occupancy space of the upper panel portion in the longitudinal direction compared to when the ceiling wall portion is connected to the general portion via a continuously curved surface or a continuous flat surface. For this reason, it is possible to suitably mount the knee protection airbag apparatus having this configuration in a vehicle with a limited mounting space. The reason is because the general portion can be provided along the substantially vertical direction. Certainly, even though the general portion is provided along the vertical direction, by virtue of the bending portion, the ceiling wall portion can be disposed above the airbag accommodation portion along the substantially horizontal direction. For this reason, when the airbag inflates, the pressure receiving portion of the ceiling wall portion can reliably receive a pressure from the airbag at the initial stage of the inflation. The upper panel portion can easily turn upwardly to the front, and thus the space for the deployment and inflation of the airbag can be formed on the rear surface-side of the upper panel portion.

DESCRIPTION OF THE PREFERRED EMBODIMENTS

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

Figure 1:
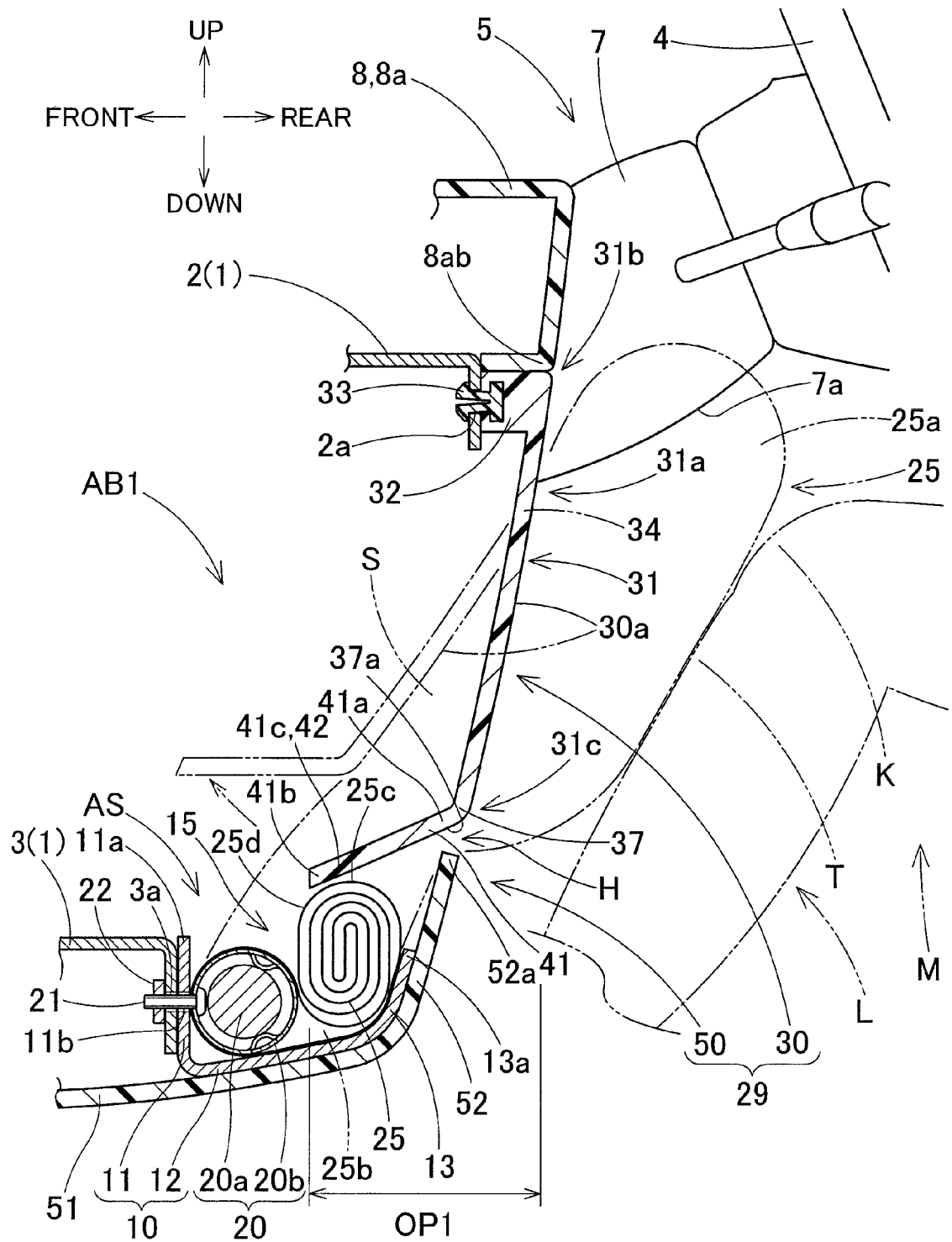
FIG. 1 is a schematic vertical cross-sectional view of a knee protection airbag apparatus according to an embodiment of the present invention, and an operational state of the knee protection airbag apparatus is illustrated by a two-dotted line.
Figure 2:
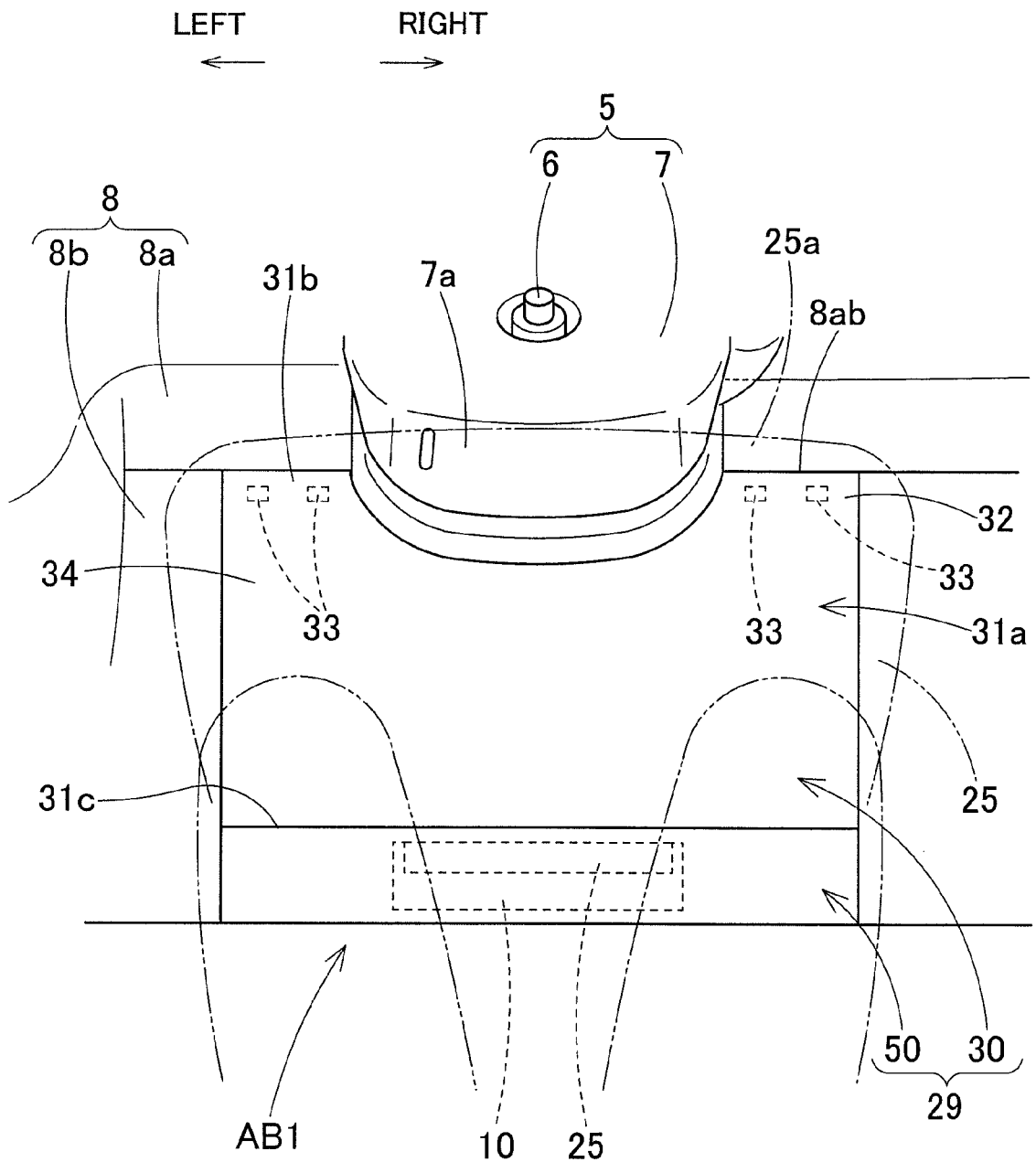
FIG. 2 is a front view of the knee protection airbag apparatus illustrated in FIG. 1 when seen from an occupant side.

As illustrated in FIGS. 1 and 2, a knee protection airbag apparatus AB1 of an embodiment is provided below a steering column 5 positioned in front of a driver M in a vehicle, and can protect knees K of the driver M as an occupant sitting in the vehicle.

A vertical direction, a lateral direction, and a longitudinal direction in the specification correspond to a vertical direction, a lateral direction, and a longitudinal direction of the vehicle, respectively, when the knee protection airbag apparatus AB1 is mounted in the vehicle.

As illustrated in FIGS. 1 and 2, the steering column 5 includes a steering shaft 6 and a column cover 7. The steering shaft 6 is connected to a steering wheel 4. The column cover 7 is a synthetic resin-made portion of a substantially rectangular cylindrical shape, and covers the steering shaft 6. The column cover 7 is provided upwardly toward the rear along an axial direction of the steering shaft 6. A lower surface 7a of the column cover 7 has a substantially rectangular shape, and the rear of the lower surface 7a is curved upwardly in the longitudinal direction of the vehicle.

The knee protection airbag apparatus AB1 includes an airbag 25, an inflator 20, a support member (a case) 10, and a front panel 29. The inflator 20 supplies inflation gas to the folded airbag 25. The support member 10 supports and accommodates the folded airbag 25 therein, and the support member 10 forms an accommodation portion 15 for the airbag 25. The front panel 29 covers a rear side of the airbag 25 which is accommodated in a folded state, and is disposed in front of lower limbs L of the driver M sitting in the vehicle. An airbag assembly AS is formed of the support member 10, the inflator 20, and the folded airbag 25.

Figure 3:
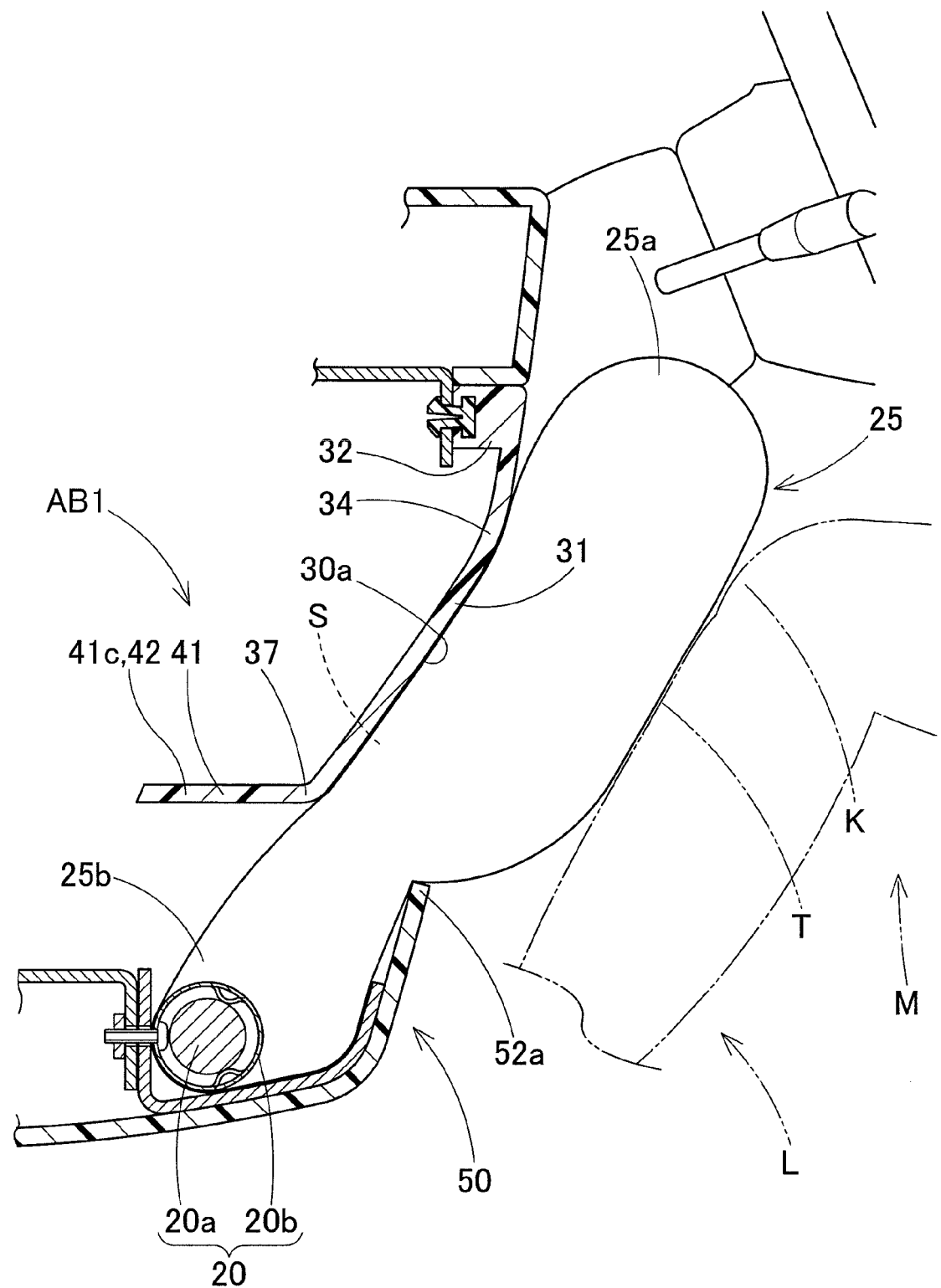
FIG. 3 is a schematic vertical cross-sectional view of the knee protection airbag apparatus under operation, which is illustrated in FIG. 1.

As illustrated by a two-dotted line and a solid line in FIGS. 1 to 3, the airbag 25 has a substantially rectangular plate shape when the inflation of the airbag 25 is completed. An upper end 25a of the completely inflated airbag 25 reaches the lower surface 7a of the column cover 7, and the inflation of the airbag 25 is completed. The inflator 20 is provided on an inner side of a lower end 25b of the completely inflated airbag 25. The support member 10 retains the airbag 25 by virtue of the inflator 20.

The inflator 20 includes a main body 20a and a retainer 20b. The main body 20a has a columnar shape extending in the lateral direction. The main body 20a is interposed and retained by the retainer 20b. The main body 20a is provided with a plurality of gas discharge ports (not illustrated) which discharge the inflation gas during the operation of the inflator 20. The retainer 20b includes a plurality of bolts 21 that protrude toward the front. Each bolt 21 protrudes toward the front via the airbag 25 and the support member 10. Each bolt 21 is inserted into an attachment hole 3a of a bracket 3 that extends from an instrument panel reinforcement (not illustrated) of a body (a vehicle body) 1 of the vehicle, and the bolt 21 is tightened by a nut 22. The airbag assembly AS is attached to the body 1 by the tightening of the nut 22.

The support member 10 is made of a metal plate. The support member 10 includes a front wall portion 11, a bottom wall portion 12, and a rear wall portion 13. The support member 10 has a U-shaped longitudinal cross-section. The front wall portion 11 is provided on a front side of the support member 10 along the vertical direction. The bottom wall portion 12 extends toward the rear from a lower end of the front wall portion 11. The rear wall portion 13 extends upwardly on a rear end side of the bottom wall portion 12. An upper end 13a of the rear wall portion 13 has substantially the same height as that of an upper end 11a of the front wall portion 11, and the rear wall portion 13 is provided so as to slope toward the rear. The front wall portion 11 has a through-hole 11b into which each bolt 21 is inserted.

The front panel 29 is made of synthetic resin such as polypropylene or ABS resin which can be deformed into a bent shape, and which has shape retention. The front panel 29 is provided in front of the lower limbs L of the driver M along a substantially vertical direction. Specifically, the front panel 29 slopes slightly so as to position a lower end of the front panel 29 on a front side, so that a space for movement for the lower limbs L of the driver M can be ensured. The front panel 29 includes a lower panel portion 50 and an upper panel portion 30. The lower panel portion 50 is disposed on a rear side of the support member 10. The upper panel portion 30 extends upwardly above the lower panel portion 50.

The upper panel portion 30 is disposed in front of a shin T and the knees K of the lower limbs L of the driver M. The lower panel portion 50 is disposed in front of a lower portion of the lower limbs L of the driver M. The upper panel portion 30 and the lower panel portion 50 are separated from each other as separate bodies. For this reason, the upper panel portion 30 and the lower panel portion 50 are separately attached to the body 1.

Furthermore, the lower panel portion 50 includes a horizontal wall portion 51 and a vertical wall portion 52. The horizontal wall portion 51 is disposed on a lower surface of the bottom wall portion 12 of the support member 10. The vertical wall portion 52 extends so as to slope upwardly to the rear from a rear end of the horizontal wall portion 51. Furthermore, the vertical wall portion 52 extends upwardly along the rear wall portion 13 of the support member 10. An upper end 52a of the vertical wall portion 52 is disposed above the upper end 13a of the rear wall portion 13.

The upper panel portion 30 includes a general portion 31 which is an upper portion of the upper panel portion 30, and a ceiling wall portion 41 which is a lower portion of the upper panel portion 30. The general portion 31 and the ceiling wall portion 41 are integrally molded and formed.

In the embodiment, an instrument panel 8 is provided around the steering column 5 in front of the driver M. The instrument panel 8 includes an upper panel 8a on an upper side of the instrument panel 8, and a lower panel 8b on a lower side of the instrument panel 8. An upper end 31b of the upper panel portion 30 is disposed at a positional height of a lower end 8ab of the upper panel 8a. In other words, the upper end 31b is disposed at a positional height of the lower panel 8b directly under the column cover 7.

The general portion 31 has an upper portion 31a positioned above the vicinity of a center portion of the general portion 31, and the upper portion 31a is disposed in front of the vicinity of the knees K of the driver M. The upper end 31b of the general portion 31 is provided with a fixation portion 32 that is fixed to the body 1. A clip (fixation means, a fixture) 33 is assembled with the fixation portion 32. The clip 33 is fixed to a bracket 2 extending from the instrument panel reinforcement which is not illustrated. A plurality (four in the embodiment) of the clips 33 is provided in the upper end 31b of the general portion 31 along the lateral direction. Each clip 33 is inserted into an attachment hole 2a of the bracket 2, and is locked into the bracket 2. When the clip 33 is fixed to the bracket 2, the upper panel portion 30 is provided on right and left sides of the column cover 7 so as to extend downwardly, connecting from the lower end 8ab of the upper panel 8a.

The ceiling wall portion 41 is provided so as to extend downwardly from the general portion 31, and to cover an upper side of the folded airbag 25. The ceiling wall portion 41 has a lower end 41b as a free end. The ceiling wall portion 41 is provided with a pressure receiving portion 42 in the vicinity of the lower end 41b, and the pressure receiving portion 42 receives a pressure from the airbag 25 at an initial stage of the inflation. The pressure receiving portion 42 is a facing portion that faces the upper side of the folded airbag 25. The pressure receiving portion 42 is disposed on a front side of the fixation portion 32 of the general portion 31. A bending portion 37 is provided in a lower end 31c of the general portion 31. For this reason, the ceiling wall portion 41 is provided so as to extend downwardly to the front from the bending portion 37.

In the embodiment, the general portion 31 of the upper panel portion 30 slopes slightly in such a manner that the lower end 31c is positioned on a front side of the upper end 31b. The general portion 31 has a flat plate shape formed along the substantially vertical direction. The ceiling wall portion 41 has a flat plate shape, sloping in such a manner that the lower end (a front end) 41b is positioned on a front lower side of the upper end (a rear end) 41a of the bending portion 37. Specifically, the ceiling wall portion 41 has a flat plate shape, with a direction, in which the rear end 41a extends to the front end 41b, slightly sloping downwardly from the horizontal direction. The lower end 41b of the ceiling wall portion 41 is disposed on a rear side of the inflator 20, and on a front side of the vicinity of a longitudinal center 25c of the folded airbag 25. That is, in the embodiment, a front portion 41c of the ceiling wall portion 41 is disposed close to the upper side of the folded airbag 25, and the front portion 41c is a portion of the ceiling wall portion 41, being positioned on a front side of the longitudinal center of the ceiling wall portion 41. For this reason, the front portion 41c functions as the pressure receiving portion 42.

Except for the fixation portion 32 in the upper panel portion 30, the general portion 31 and the ceiling wall portion 41 have a uniform thickness, and are integrally formed.

In the upper panel portion 30, the fixation portion 32 is positioned on an upper rear side of the pressure receiving portion 42, and the pressure receiving portion 42 is positioned above a rear portion 25d of the folded airbag 25, being oriented toward a lower front side. For this reason, when the pressure receiving portion 42 is pushed by the airbag 25 that deploys and inflates upwardly during the inflation of the airbag 25, the upper panel portion 30 undergoes a forward turning moment. The upper panel portion 30 moves so as to turn upwardly to the front by forming the vicinity of a lower portion of the fixation portion 32 into a bending deformation portion 34.

When the knee protection airbag apparatus AB1 of the embodiment is mounted in the vehicle, first, the airbag assembly AS is assembled. In the assembly process, each bolt 21 is installed so as to protrude, and the inflator 20 is accommodated in the airbag 25. Thereafter, the airbag 25 is folded, and the airbag 25 along with the inflator 20 is disposed on the bottom wall portion 12 of the support member 10. Furthermore, when each bolt 21 protrudes from the through-hole 11b of the support member 10, it is possible to assemble the airbag assembly AS. Each bolt 21 is inserted into the attachment hole 3a of the bracket 3, and is tightened by the nut 22. Furthermore, when the inflator 20 is wired to operation lead wires (not illustrated) extending from an airbag operation circuit of the vehicle, it is possible to mount the airbag assembly AS in the vehicle. Thereafter, each clip 33 is inserted into the attachment hole 2a, and is locked into the bracket 2, and thus the upper panel portion 30 is attached to the body 1. An attachment portion (not illustrated) of the lower panel portion 50 is attached to the body 1, and the front panel 29 is attached to the vehicle. As a result, it is possible to assemble and mount the knee protection airbag apparatus AB1 in the vehicle.

When the inflator 20 operates in a state of the knee protection airbag apparatus AB1 being mounted in the vehicle, the inflation gas flows into the airbag 25 from the inflator 20, and the airbag 25 inflates. In the knee protection airbag apparatus AB1, the pressure receiving portion 42 of the ceiling wall portion 41 of the upper panel portion 30 receives an upward pressure from the airbag 25 at the initial stage of the inflation. Accordingly, as illustrated by the two-dotted line in FIG. 1 or by the solid line in FIG. 3, the bending deformation portion 34 in the vicinity of the fixation portion 32 of the upper panel portion 30 undergoes a bending deformation, and the ceiling wall portion 41 and the general portion 31 of the upper panel portion 30 moves to the front, while integrally turning upwardly to the front. A space S is formed on a rear surface-side of the upper panel portion 30 that moves to the front. For this reason, the inflating airbag 25 deploys and inflates upwardly, while entering the space S formed on the rear surface-side of the upper panel portion 30 from between the upper end 52a of the lower panel portion 50 and the ceiling wall portion 41 that moves to the front. The inflation of the airbag 25 is completed in front of the knees K of the driver M.

In the knee protection airbag apparatus AB1 of the embodiment, the vicinity of the fixation portion 32 of the upper portion 31a of the general portion 31 functions as the bending deformation portion 34. The ceiling wall portion 41, which is the lower portion of the upper panel portion 30, and the general portion 31, which is the upper portion of the upper panel portion 30, integrally turn upwardly to the front, so that the upper panel portion 30 moves to the front. For this reason, in the knee protection airbag apparatus AB1, no notched groove or separation portion is formed between the ceiling wall portion 41 and the general portion 31, and the ceiling wall portion 41 and the general portion 31 simply and integrally connect to each other. As a result, in the knee protection airbag apparatus AB1, the ceiling wall portion 41 and the general portion 31 are not separated from each other, and a stable forward movement of the upper panel portion 30 is ensured.

Accordingly, in the knee protection airbag apparatus AB1 according to the embodiment, when the airbag 25 inflates, it is possible to stably move the upper panel portion 30 to the front, and thus it is possible to stably form the space S for the deployment and inflation of the airbag 25 in front of the knees K of the driver M as an occupant. In the embodiment, even though the knees K of the driver M are close to the upper panel portion 30 at the initial stage of the inflation of the airbag 25, the inflated airbag 25 is smoothly disposed in front of the knees K of the driver M. For this reason, the knees K of the driver M close to the upper panel portion 30 are reliably protected by the airbag 25.

As illustrated in FIG. 3, the completely inflated airbag 25 is supported by a rear surface 30a of the upper panel portion 30 that moves to the front. A front surface of the upper end 25a receiving the knees K is supported by the vicinity of the fixation portion 32 of the upper panel portion 30, the forward movement of which is regulated. For this reason, the completely inflated airbag 25 can ensure a reaction force by virtue of the general portion 31 of the upper panel portion 30, and can reliably receive the knees K moving to the front.

The lower end (the front end) 41b of the ceiling wall portion 41 is disposed in the longitudinal direction on the rear side of the inflator 20, and on the front side of the vicinity of the longitudinal center 25c of the folded airbag 25. For this reason, the pressure receiving portion 42 (in the vicinity of the front portion 41C of the ceiling wall portion 41) can reliably receive a pressure from the airbag 25 at the initial stage of the inflation.

In the embodiment, the upper panel portion 30 is provided with the bending portion 37, and the ceiling wall portion 41 is provided so as to bend from the lower end 31c of the general portion 31, and to extend downwardly to the front. The upper end 52a of the lower panel portion 50 is provided in the vicinity of a lower surface 37a of the bending portion 37.

For this reason, in the embodiment, the general portion 31 of the upper panel portion 30 can be flush with the vertical wall portion 52 of the lower panel portion 50. In addition, it is possible to reduce a gap H between the lower panel portion 50 and the upper panel portion 30. For this reason, it is possible to improve the appearance of the region in which the front panel 29 is provided, that is, the appearance of the region in front of the lower limbs L of the driver M.

Furthermore, in the configuration having the bending portion 37, it is possible to further reduce an occupancy space OP1 of the upper panel portion 30 in the longitudinal direction, compared to when the ceiling wall portion 41 is connected to the general portion 31 via a continuously curved surface or a continuous flat surface. For this reason, it is possible to suitably mount the knee protection airbag apparatus having the aforementioned configuration in a vehicle with a limited mounting space. The reason why the providing of the bending portion 37 in the upper panel portion 30 reduces the occupancy space OP1 is because the general portion 31 can be provided along the substantially vertical direction. Certainly by virtue of the bending portion 37, the pressure receiving portion 42 of the ceiling wall portion 41 can be disposed above the airbag accommodation portion 15 along the substantially horizontal direction. The pressure receiving portion 42 is likely to turn upper panel portion 30 upwardly to the front by using a pressure from the airbag 25 at the initial stage of the inflation. The space S for the airbag 25 can be easily ensured.

Figure 4:
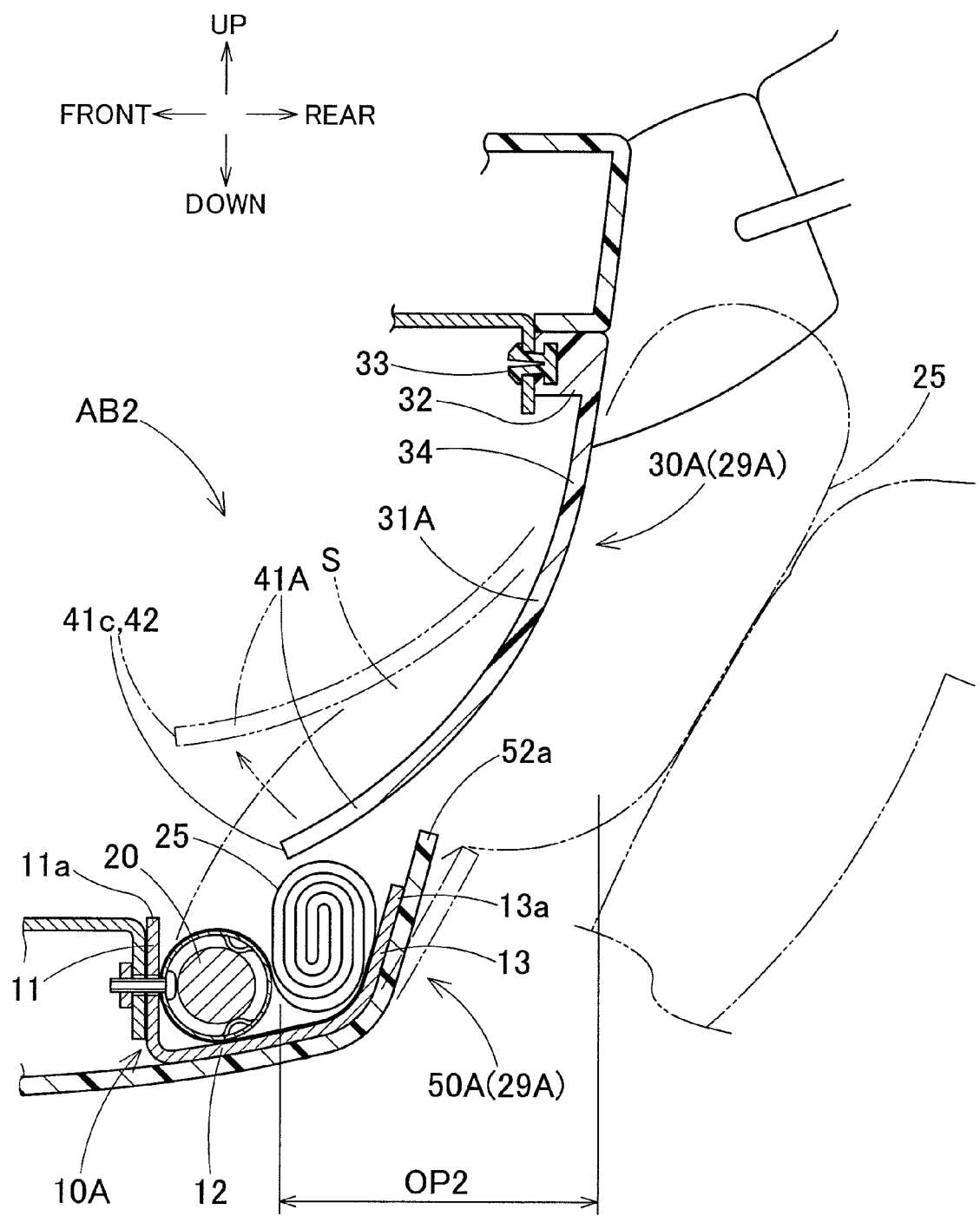
FIG. 4 is a schematic vertical cross-sectional view of the knee protection airbag apparatus according to a modification example of the embodiment.

Certainly, the aforementioned point being not taken into consideration, as in a knee protection airbag apparatus AB2 illustrated in FIG. 4, a ceiling wall portion 41A of an upper panel portion 30A may be connected to a general portion 31A via a continuously curved surface. Alternatively, as in a knee protection airbag apparatus AB3 illustrated in FIG. 5, a ceiling wall portion 41B of an upper panel portion 30B may be connected to a general portion 31B via a flat surface.

In the knee protection airbag apparatus AB2 illustrated in FIG. 4, a front panel 29A includes the upper panel portion 30A and a lower panel portion 50A. A portion of the upper panel portion 30A functions as a ceiling wall portion 41A, the portion ranging from the vicinity of a region above the upper end 52a of the lower panel portion 50A to a front region. The front portion 41c functions as the pressure receiving portion 42. In the airbag apparatus AB2, when the airbag 25 inflates, the upper panel portion 30A moves to the front, having the vicinity of a portion directly under the fixation portion 32 as the bending deformation portion 34. For this reason, the space S for the deployment and inflation of the airbag 25 is formed in front of the knees K.

Figure 5:
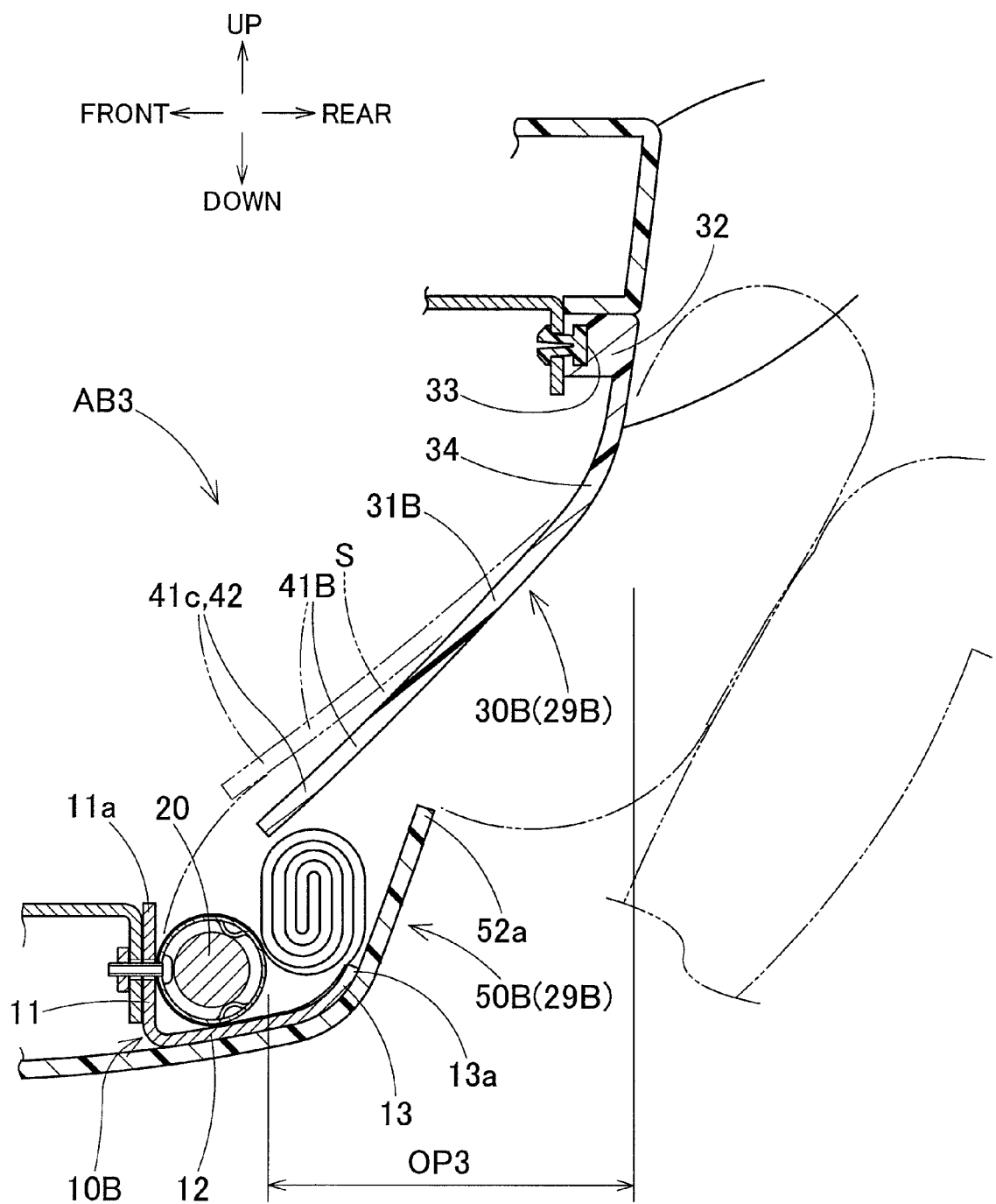
FIG. 5 is a schematic vertical cross-sectional view of the knee protection airbag apparatus according to another modification example of the embodiment.

In the knee protection airbag apparatus AB3 illustrated in FIG. 5, a front panel 29B includes the upper panel portion 30B and a lower panel portion 50B. A portion of the upper panel portion 30B functions as a ceiling wall portion 41B, the portion ranging from the vicinity of a region above the upper end 52a of the lower panel portion 50B to a front region. The front portion 41c functions as the pressure receiving portion 42. In the airbag apparatus AB3, when the airbag 25 inflates, the upper panel portion 30B turns upwardly to the front, and moves to the front, having the vicinity of a portion directly under the fixation portion 32 as the bending deformation portion 34. Accordingly, the space S for the deployment and inflation of the airbag 25 is formed in front of the knees K.

In the knee protection airbag apparatuses AB2 and AB3, each of the respective upper panel portions 30A and 30B has a long dimension in the longitudinal direction. For this reason, respective occupancy spaces OP2 and OP3 in the longitudinal direction of the upper panel portions 30A and 30B are greater than the occupancy space OP1 of the upper panel portion 30 of the knee protection airbag apparatus AB1 according to the embodiment.

Figure 6:
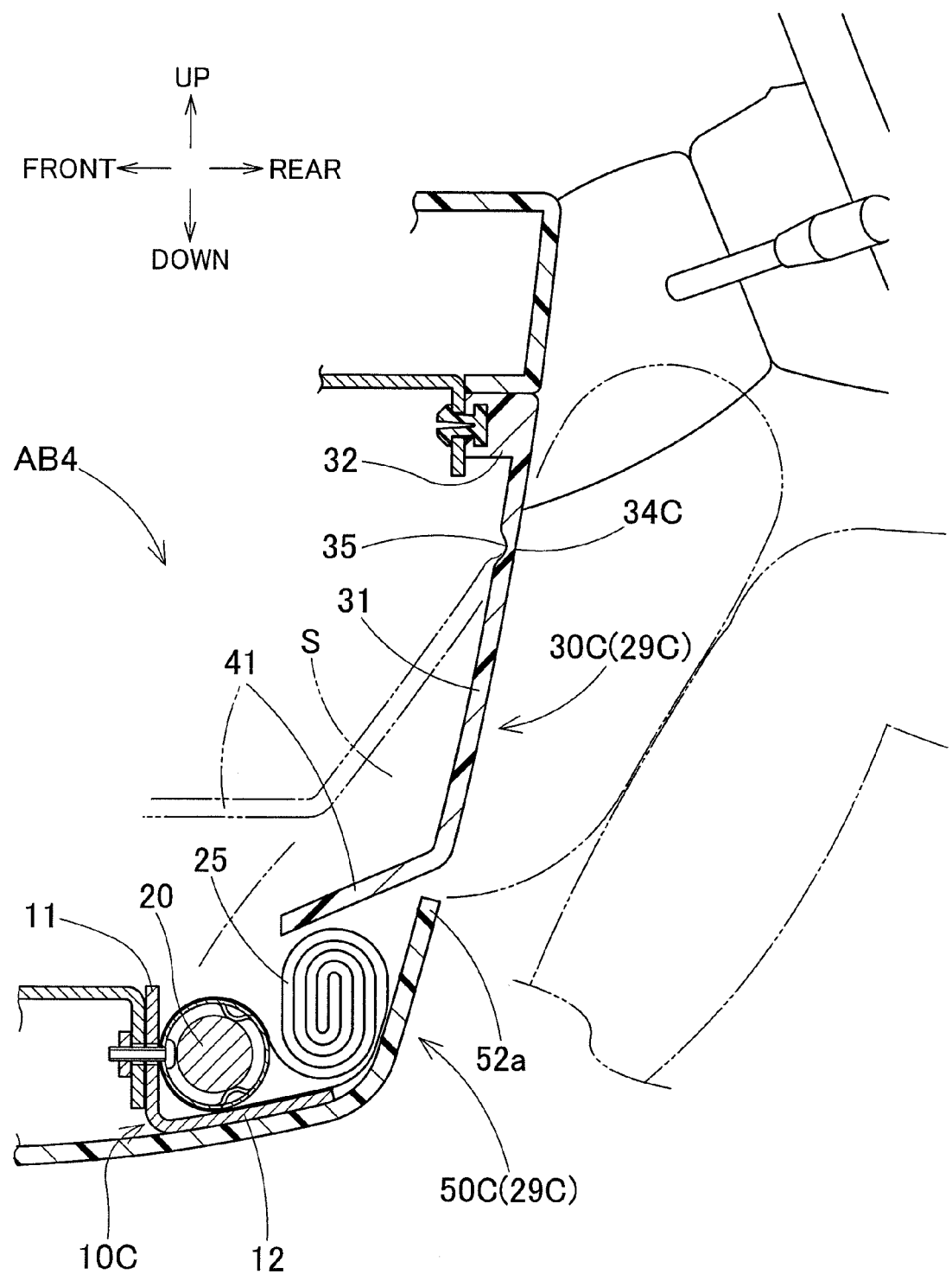
FIG. 6 is a schematic vertical cross-sectional view of the knee protection airbag apparatus according to still another modification example of the embodiment.
Figure 7:
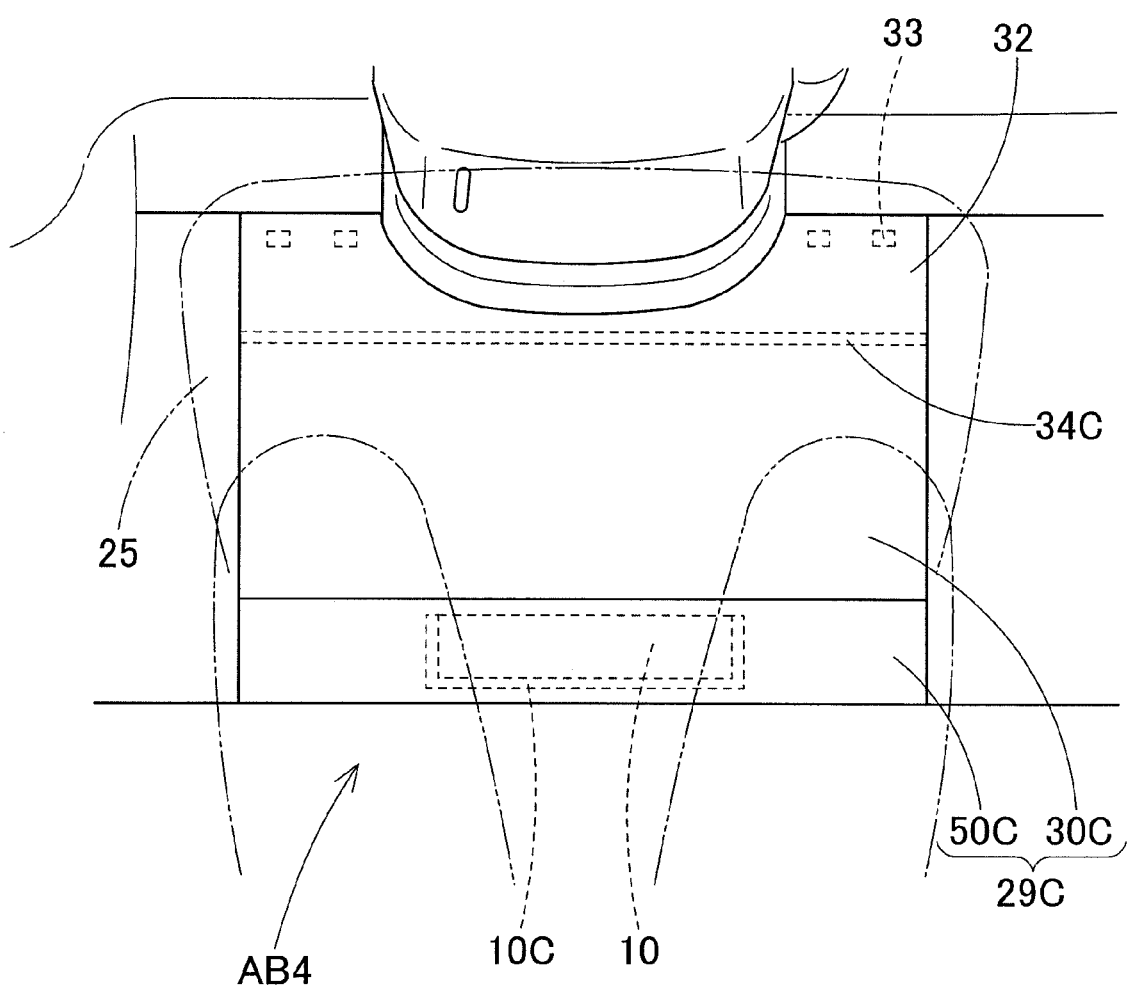
FIG. 7 is a front view of the knee protection airbag apparatus illustrated in FIG. 6 when seen from the occupant side.

In the embodiment, in the upper panel portion 30, the bending deformation portion 34 has the same thickness as that of other portions. However, the bending deformation portion may be formed similar to a bending deformation portion 34C of a knee protection airbag apparatus AB4 illustrated in FIGS. 6 and 7. A concave grooved thin-wall portion 35 is continuously or intermittently provided in the bending deformation portion 34C along a lateral direction so that the bending deformation can be facilitated. The bending deformation portion 34C is provided in the vicinity of the portion directly under the fixation portion 32.

Furthermore, the support member 10 for the support of the airbag 25 may have any configuration insofar as the support member 10 can support the inflation of the airbag 25. That is, the pressure receiving portion 42 of the ceiling wall portion 41 is pushed up by the airbag 25 at the initial stage of the inflation, and the upper panel portion 30 smoothly moves to the front, having the bending deformation portion 34 as the turning center. The support member 10 is preferably formed in such a manner that the support member 10 can support the inflation of the inflating airbag 25. In the embodiment illustrated in FIGS. 1 and 3, the support member 10 includes the front wall portion 11, the bottom wall portion 12, and the rear wall portion 13, and has a U-shaped longitudinal cross-section. The upper end 11a of the front wall portion 11 has substantially the same height as that of the upper end 13a of the rear wall portion 13. However, as described above, the support member 10 may have any configuration insofar as the support member 10 can support the airbag 25. For this reason, as in a support member 10A of the knee protection airbag apparatus AB2 illustrated in FIG. 4, the upper end 13a of the rear wall portion 13 may be set to have a height higher than that of the upper end 11a of the front wall portion 11. Alternatively, as in a support member 10B of the knee protection airbag apparatus AB3 illustrated in FIG. 5, the upper end 13a of the rear wall portion 13 may be set to have a height lower than that of the upper end 11a of the front wall portion 11. Furthermore, as in a support member 10C of the knee protection airbag apparatus AB4 illustrated in FIG. 6, the support member 10C may have an L-shaped longitudinal cross-section. That is, the support member 10C does not include the rear wall portion 13, and includes only the front wall portion 11 and the bottom wall portion 12.

In the examples, the knee protection airbag apparatuses AB1, AB2, AB3, and AB4 are selectively described, each of which is disposed in front of the driver M in the vehicle so as to protect the knees K of the driver M. However, the present invention may be applied to a knee protection airbag apparatus that can protect the knees of an occupant sitting in a front passenger seat.

What is claimed is:

1. A knee protection airbag apparatus comprising;
   an airbag;
   an accommodation portion accommodating the airbag in a folded state in front of the lower limbs of a sitting occupant; and
   a front panel provided in front of the lower limbs of the occupant along a substantially vertical direction, the front panel including:
      a lower panel portion disposed on a rear side of the accommodation portion for the airbag, and
      an upper panel portion disposed above the lower panel portion, wherein the upper panel portion includes:
      a general portion disposed in an upper portion of the upper panel portion and in front of the knees of the occupant, and
      a ceiling wall portion formed integrally with the general portion, the ceiling wall portion extending outwardly from the general portion and covering an upper side of the folded airbag,
   wherein the general portion of the upper panel portion includes an upper portion fixed to a vehicle body and a lower free end, the lower free end freely extending from the ceiling wall portion,
   wherein the lower panel portion is separate from the upper panel portion, the lower panel portion covers a rear side of the folded airbag, and the lower panel portion includes an upper end adjacent a lower surface of a rear end of the ceiling wall portion, and
   wherein the upper panel portion includes:
      a pressure receiving portion encompassing a facing portion of the ceiling wall portion that faces the folded airbag, the facing portion being disposed on a front side of a fixation portion of the general portion, the fixation portion being fixed to the vehicle body, and the facing portion receiving a pressure from the airbag at an initial stage of inflation, and
      a bending deformation portion disposed adjacent the fixation portion of the general portion, the bending deformation portion being fixed to the vehicle body and bending when the upper panel portion moves to the front along with the inflation of the airbag.

2. The knee protection airbag apparatus according to claim 1,
wherein the upper panel portion is provided with a bending portion in which the ceiling wall portion bends from a lower end of the general portion, and is provided to extend downwardly to the front, and
wherein the upper end of the lower panel portion is provided in the vicinity of a lower surface of the bending portion.

3. The knee protection airbag apparatus according to claim 1,
wherein in the upper panel portion, the ceiling wall portion is connected to the general portion via a continuously flat surface,
wherein a portion of the upper panel portion functions as the ceiling wall portion, the portion ranging from the vicinity of a region above the upper end of the lower panel portion to a front region, and
wherein a front portion of the ceiling wall portion functions as the pressure receiving portion.

4. The knee protection airbag apparatus according to claim 1,
wherein a concave grooved thin-wall portion is continuously or intermittently provided in the bending deformation portion along a lateral direction.

5. The knee protection airbag apparatus according to claim 1,
wherein the lower end of the ceiling wall portion is disposed on a front side of the vicinity of a longitudinal center of the airbag which is accommodated in a folded state.

6. The knee protection airbag apparatus according to claim 1,
wherein the folded airbag is accommodated in a state of being supported by a metal plate-made support member, and
wherein the support member has a front wall portion, a bottom wall portion, and a rear wall portion, and has a U-shaped longitudinal cross-section.

7. The knee protection airbag apparatus according to claim 1,
wherein the folded airbag is accommodated in a state of being supported by a metal plate-made support member, and
wherein the support member has a front wall portion, and a bottom wall portion, and has an L-shaped longitudinal cross-section.

8. A knee protection airbag apparatus, comprising;
an airbag bag;
an accommodation portion accommodating the airbag in a folded state in front of the lower limbs of a sitting occupant; and
a front panel provided in front of the lower limbs of the occupant along a substantially vertical direction, the front panel including;
a lower panel portion disposed on a rear side of the accommodation portion for the airbag, and
an upper panel portion disposed above the lower panel portion,
wherein the upper panel portion includes:
a general portion disposed in an upper portion of the upper panel portion and in front of knees of the occupant, and
a ceiling wall portion formed integrally with the general portion, the ceiling wall portion extending outwardly from the general portion and covering an upper side of the folded airbag,
wherein the general portion of the upper panel portion includes an upper portion fixed to a vehicle body and a lower end freely extending from the ceiling wall portion,
wherein the lower panel portion is separate from the upper panel portion, the lower panel portion covers a rear side of the folded airbag, and the lower panel portion includes an upper end adjacent a lower surface of a rear end of the ceiling wall portion, and
wherein the upper panel portion includes:
a pressure receiving portion encompassing a facing portion of the ceiling wall portion that faces the folded airbag, the facing portion being disposed on a front side of a fixation portion of the general portion, the fixation portion being fixed to the vehicle body, and receiving a pressure from the airbag at an initial stage of inflation, and
a bending deformation portion disposed adjacent the fixation portion of the general portion, the bending deformation portion being fixed to the vehicle body and bending when the upper panel portion moves to the front along with the inflation of the airbag,
wherein in the upper panel portion, the ceiling wall portion is connected to the general portion via a continuously curved surface,
wherein a portion of the upper panel portion functions as the ceiling wall portion, the portion ranging from the vicinity of a region above the upper end of the lower panel portion to a front region, and
wherein a front portion of the ceiling wall portion functions as the pressure receiving portion.

* * * * *